A. L. ANDREWS.
Hitching-Bar.
No. 213,084. Patented Mar. 11, 1879.
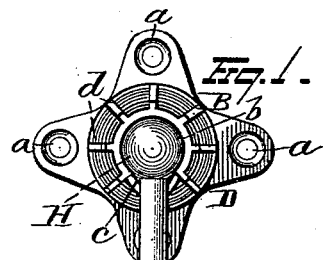
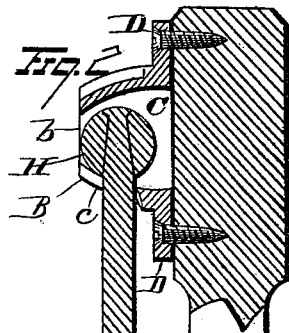
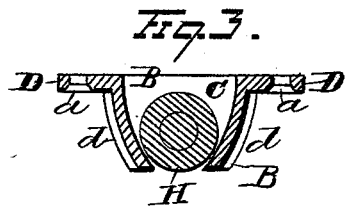
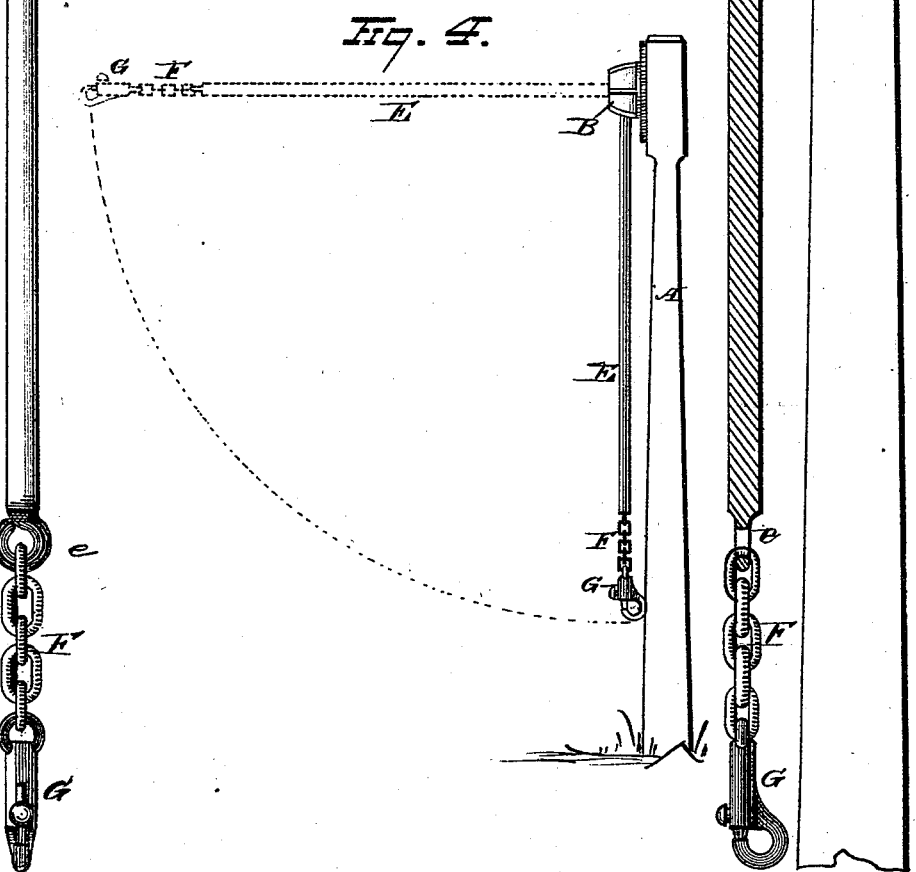
WITNESSES
E. J. Nottingham
Geo. D. Seymour
INVENTOR
Albert L. Andrews
By H. A. Seymour
ATTORNEY

UNITED STATES PATENT OFFICE.

ALBERT L. ANDREWS, OF PROVIDENCE, RHODE ISLAND.

IMPROVEMENT IN HITCHING-BARS.

Specification forming part of Letters Patent No. 213,084, dated March 11, 1879; application filed November 29, 1878.

*To all whom it may concern:*

Be it known that I, ALBERT L. ANDREWS, of Providence, in the county of Providence and State of Rhode Island, have invented certain new and useful Improvements in Hitching-Bars; and I do hereby declare the following to be a full, clear, and exact description of the invention, such as will enable others skilled in the art to which it pertains to make and use it, reference being had to the accompanying drawings, which form part of this specification.

My invention relates to an improvement on the hitching-bar for which Letters Patent No. 198,832 were granted me January 1, 1878; and the invention consists in the combination, with a flanged socket, of a hitching-bar provided with a ball on one end thereof, the parts being constructed in such a manner that the hitching-bar, when not in use, will hang down beside the post or other object to which the bar is attached, and when employed in securing a horse the bar will be limited in its radial movement by means of the peculiar construction of joint, as will be hereinafter described, whereby the horse will be prevented from gnawing the post or shed to which the device is secured.

In the accompanying drawings, Figure 1 is a side elevation of my improved hitching-bar. Fig. 2 is a vertical section, and Fig. 3 a transverse section, of the same.

A represents an ordinary hitching-post. B is the cup-shaped casing of a ball-and-socket joint, the socket C of which has a flange, D, projecting outwardly therefrom, said flange having screw-holes $a$ formed therein, whereby the casing B may be readily and securely attached to the side of a post, shed, or other object.

E represents a hitching-bar, having a ring, $e$, on its outer end for the attachment of a chain, F, and snap-hook G. The opposite end of bar E is provided with a ball, H, which is welded or otherwise rigidly secured to the end of the bar. Ball H is placed within the socket C, the outer opening, $b$, of which is sufficiently larger than the bar E to allow the latter to be moved radially within fixed limits.

The lower side of socket C is formed with a slot, $c$, which extends to the flange D, whereby the bar may drop down and hang in a vertical position when not in use.

The socket C is preferably provided with ribs $d$, to impart the required strength thereto, without materially increasing the weight of the casting.

When the bar is raised and a horse is secured to the snap-hook attached to the outer end thereof, it will be observed, by reference to Fig. 4, that it will be impossible for the horse to gnaw the post or other object to which the device is attached; and, also, the animal is prevented from stepping onto the curb or pavement; and, further, the device effectually prevents the horse from rubbing his head against the post or shed, and thus breaking or displacing his bridle or other portion of the harness.

From the foregoing it will be observed that my improved device is simple and durable in its construction, and is adapted to be firmly attached to a post or other object.

The flange D is of sufficient breadth to afford a broad and extended bearing for the casing of the ball-and-socket joint, and does not require the cutting or recessing of a post or side of a shed for its attachment thereto.

The ball on the end of the hitching-bar is sufficiently larger than the opening $b$ in the socket C to effectually preclude the displacement of the hitching-bar from the socket, while on the other hand the bar is adapted to have a free universal-joint movement, which is impossible when the bar is attached to the eye of a staple.

Having fully described my invention, what I claim as new, and desire to secure by Letters Patent, is—

The combination of a socket, slotted and flanged, as shown, with a hitching-bar provided with a ball upon one end, whereby the bar has a free swiveling motion, all adapted to be secured to a hitching-post or other object, substantially as shown and described, and for the purpose stated.

In testimony that I claim the foregoing I have hereunto set my hand and seal.

ALBERT L. ANDREWS. [L. S.]

Witnesses:
 JAMES HACKETT,
 HOWARD C. BLIVEN.